INVENTOR.
GEORGE B. COTTRELL
BY Edward A. Sokolski
ATTORNEY

March 29, 1966 G. B. COTTRELL 3,243,707

TRANSFORMERLESS DEMODULATOR

Filed July 2, 1962 2 Sheets-Sheet 2

INVENTOR.
GEORGE B. COTTRELL
BY Edward A. Sokolski
ATTORNEY 3,243,707
TRANSFORMERLESS DEMODULATOR
George B. Cottrell, Norwalk, Calif., assignor to North American Aviation, Inc.
Filed July 2, 1962, Ser. No. 206,653
14 Claims. (Cl. 329—50)

This invention relates to a demodulator circuit and more specifically to a series type demodulator circuit which does not use transformers.

The need for micro-miniaturized circuits has prompted the development of demodulator circuits which do not require the use of large and cumbersome transformers. In addition to having components suited to micro-miniaturization, the circuit must also achieve isolation of gating power from signal power. The prior art discloses a shunt type demodulator utilizing a single transistor switch which eliminates transformers and is both compact and of simple design, but this circuit has been found to have a low efficiency and to be unsuited for the delivery of power to a subsequent stage due to its inherent high internal impedance. The shunt type demodulator is also limited in that the signal voltage applied at the input must never exceed the voltage appearing at the base on the reference gate as under such conditions, the switch would become conductive at a time when it was supposed to be cut off.

Applicant's circuit overcomes the shortcomings of prior art devices by providing a compact unit which has complete bilateral switching symmetry without the use of shunt circuitry or transformers. Further, in applicant's device, the gating signal is prevented from appearing at the output as is the case with the shunt type circuit.

Applicant's demodulator is comprised of a switching circuit and gating circuit. A modulated signal is applied to the input of the switching circuit and an A.C. reference signal is applied to the input of the gating circuit. During one half cycle, energy from the reference signal is stored in a capacitor so that on each succeeding half cycle of the reference signal the gating circuit becomes conductive. The switching circuit is responsive to this conduction and also turns on. When it turns on, the envelope of the modulated wave appears across an output load, thereby effecting phase sensitive demodulation. Applicant's device may also be used to effect full wave phase sensitive demodulation.

Therefore, it is an object of this invention to provide a demodulator circuit suitable for micro-miniaturization.

It is another object of this invention to provide a demodulator circuit suitable for micro-miniaturization use which does not require transformers or shunt type circuitry.

It is still another object of this invention to provide a gating circuit which does not require transformers.

Figure 1:
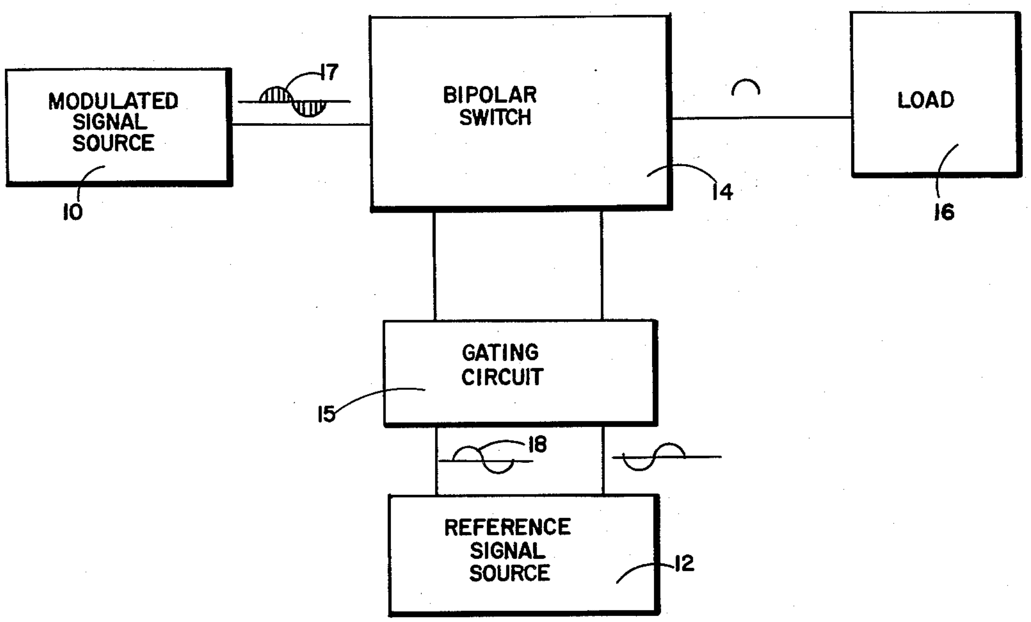
Figure 2:
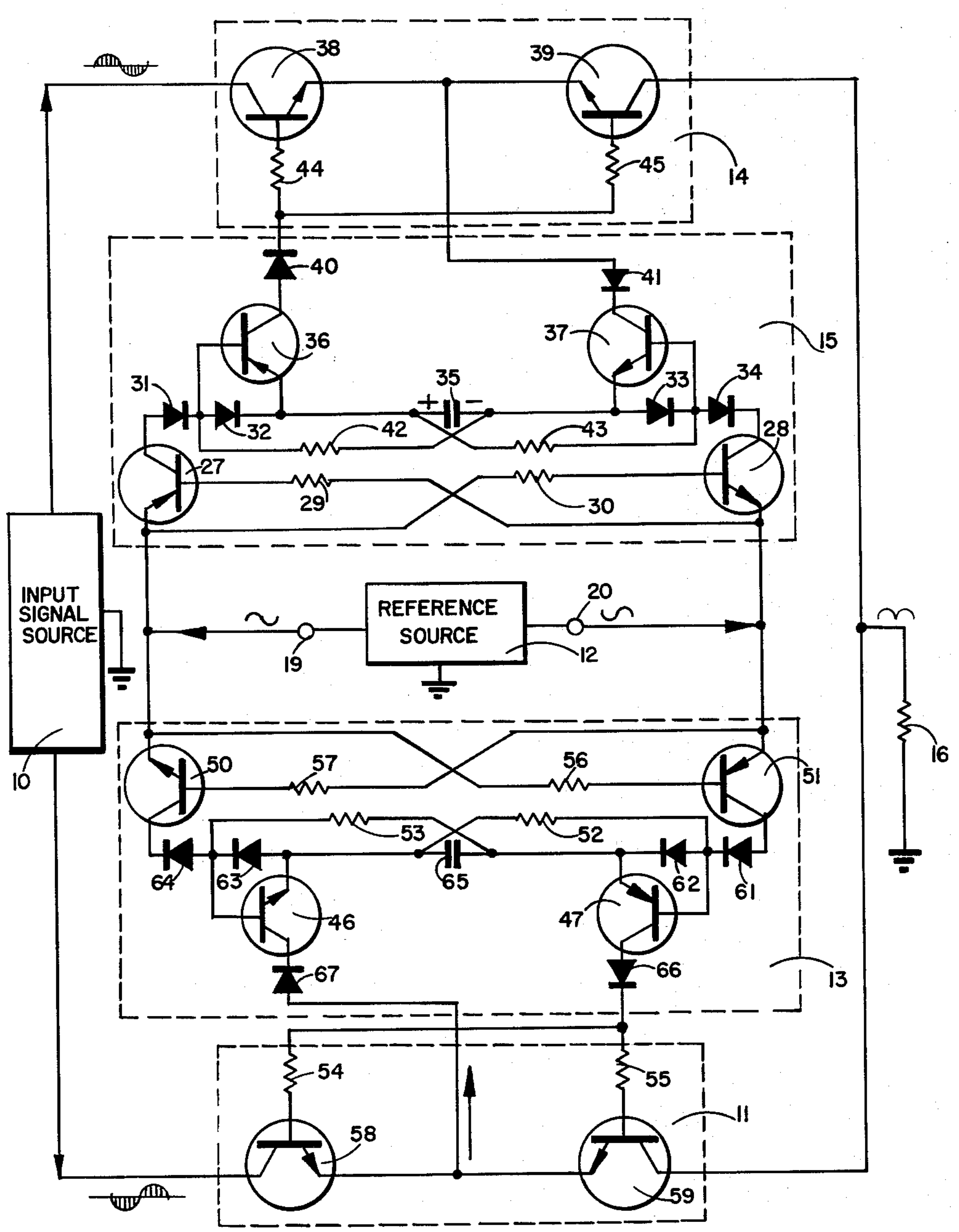

Other and more specific objects of this invention will become apparent from a reading of the following specification and claims taken in connection with the accompanying drawings of which:

FIG. 1 is a block diagram illustrating the basic operation of the invention; and FIG. 2 is a schematic diagram of a preferred embodiment of the devices of the invention.

Referring now to FIG. 1, the reference signals fed from reference signal source 12 cause the gating circuit 15 to become conductive on alternate half cycles. For the phase relationship shown between the modulation envelope 17 and the reference signal 18, on the first half cycle the gating circuit 15 would store energy and would be non-conductive, on the next half cycle the gating circuit 15 would be isolated from source 12 and the stored energy would cause gating circuit 15 to become operative. Whenever gating circuit 15 becomes operative, bipolar switch 14 responds and also becomes operative to provide a unidirectional current path from signal source 10 to the load 16. The modulated input signal fed from modulated signal source 10 then appears at the output load 16. Only the envelope, or average value of the waveform, would appear at the output load 16, thereby achieving demodulation.

Obviously full wave phase sensitive demodulation would be achieved by connecting an identical device to the reference source 12 and to the modulated signal source 10 so that when one circuit was storing energy and disconnecting the modulated signal from the load, the other circuit would be discharging stored energy and connecting the modulated signal to the load.

Referring to FIG. 2, a full wave embodiment of the device of the invention is shown, in which, bipolar switch 11 is identical in structure to bipolar switch 14, and gating circuit 13 is identical in structure to gating circuit 15. Inasmuch as the circuits function identically on alternate half cycles only the operation of the circuit for producing a half wave will be discussed in detail.

Also, it should be understood from the preceding and subsequent paragraphs that the switch-gating circuit combination may be used as modulators wherein low frequency signals are modulated upon high frequency carriers.

For purposes of this discussion, the polarities of the signals are assumed as shown, although the signals are alternating signals and the polarities are chosen as a matter of convenience only. The circuit should not be understood to be limited to the particular polarity shown since it it clear that any phase of any signal may be changed with respect to any other signal or relative to each other signal. This statement will become more meaningful after the discussion below.

Opposite phase reference signals from source 12 are fed from terminals 19 and 20 to respectively forward bias transistors 27 and 28 to saturation. Base drive for each transistor is furnished through resistors 29 and 30. Diodes 31, 32, 33, and 34 are also forward biased and are cut on. Therefore between the opposite phase input reference signals appears only the capacitor 35, insofar as electrical resistance is concerned. The dynamic forward impedance of the diodes and transistors is very low during the conduction state. The voltage drop across diodes 32 and 33 provides sufficient back bias between the emitter-base of transistors 36 and 37 to cut these transistors off. Diodes 32 and 33 could effectively be replaced by resistors, although the charge and discharge time of the capacitor 35 would be affected and it might be necessary to increase the value of the capacitance used to offset the effect of the replacement. The capacitor 35 sees a positive signal from reference source 12 on one plate side and a negative signal from reference source 12 on the other plate side and charges to the difference of their magnitudes at peak value.

During this charging cycle, the reference source 12 is isolated from the demodulation circuit for the other half cycle due to the inverse or back bias provided by the reference signals on transistors 50 and 51. Transistors 38 and 39 are also cut off because there is no source of base drive until transistors 36 and 37 are cut on. Because transistors 38 and 39 are cut off, the modulated input signal from modulated signal source 10 is isolated from the output load 16. Diodes 40, 41, 31, and 34 are placed in series with the collectors of transistors 36, 37, 27, and 28 respectively to prevent reverse current flow through the transistors from the input signal source when the transistors are supposed to be kept in an off state.

When the reference signals from source 12 alternate to the next half cycle or change 180° from the polarity originally selected, the emitter base junctions of transistors 27 and 28 are back biased and cut off thereby isolating the reference source 12 from the first half wave demodulation circuit.

The voltage across the capacitor 35 then appears across the emitter-base junctions of transistors 36 and 37 through resistors 42 and 43 respectively. Transistors 36 and 37 are driven into saturation by the applied voltage from capacitor 35. The collector current supplied by transistor 36 serves as the base drive for transistors 38 and 39 and cuts these transistors on. The collector current for transistor 37 is supplied by the emitter currents from transistors 38 and 39.

The values of capacitor 35 and resistors 42, 43, 44, and 45 depend on the frequency of operation and on the magnitude of the input signals to be demodulated. Capacitor 35 must be large enough to store the energy needed to turn on the bipolar switch 14 for a period of one alternation of the carrier frequency. For practical purposes, the capacitor may be many times larger than the minimum value with little corresponding change in circuit operation. For example if the reference signals from reference source 12 are alternating at a frequency of 5 kilocycles, the period of one alternation would be 0.0001 second. The discharge time constant may be made ten times greater than this value, so that the capacitor will not discharge appreciably during the discharge cycle of the couplers and the voltages across the capacitor will remain substantially constant.

During the discharge cycle, capacitor 35 discharges through three parallel paths. Two paths contain virtually the same resistance value, i.e., resistors 42 and 43. The other path is through transistors 36 and 37. The size of the resistors 42, 43, 44, and 45 is determined by the size of the current supplied by modulated input source 10. For example if the signal current is five milliamperes, then sufficient base drive must be supplied to transistors 38 and 39 to turn the transistors on to that value. It should be noted in this connection, however, that depending on what phase of the input signal is passed through the bipolar switch 14, one of the transistors 38, 39 will always be conductive in the reverse direction. Therefore, inverse Beta must be taken into consideration. Assume that inverse Beta is 2. Taking all the assumptions made then, a typical value for resistors 42 and 43 might be 160 kilohms. The value of resistors 44 and 45 might be approximately 3.5 kilohms. A value of capacitor 35 to satisfy the requirements of having a time constant ten times the period might be 0.65 microfarad.

If diodes 32 and 33 were replaced by resistors of sufficient size to keep transistors 36 and 37 cut off during the charging cycle, then the capacitor 35 would have an additional discharge path and it might be necessary to increase the value to take this into consideration.

Since transistors 38 and 39 were cut on by the base current supplied by transistor 36, they appear as essentially a short circuit to the modulated input signal from source 10 and the waveform of the signal appears across the output load 16.

As stated earlier the other half wave demodulator was in the storage cycle during this period and transistors 58 and 59 were cut off thereby decoupling the modulated input signal 10 from the output load 16. When the reference input signals from source 12 have undergone a 180° phase shift, the storage cycle changes to a discharge cycle and the discharge cycle for the first half wave demodulation changes to a storage cycle as previously discussed. Transistors 46, 47, 50, 51, 58, 59, diodes 61, 62, 63, 64, 66, 67, resistors 52, 53, 54, 55, 56, 57, and capacitor 65 serve the same purpose as transistors 36, 37, 27, 28, 38, 39, diodes 33, 34, 32, 31, 40, 41, resistors 42, 43, 44, 45, 29, 30, and capacitor 35 respectively on alternate half cycles of the reference signals from reference source 12.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a transformerless demodulator circuit for achieving phase sensitive demodulation of a modulated input signal, an output load, an alternating reference signal source, a bipolar switch connected between said signal input and said load; gating means connected between said switch and said reference signal source for alternately causing said switch to connect and disconnect said modulated signal to said load, said gating means including means for storing energy from said reference signal in response to one half cycle of the output thereof and means for causing an energy output in response to the other half cycle of the output of said reference signal source, said switch being turned on in response to the energy output of said gating means.

2. The circuit as recited in claim 1 wherein said gating means further includes means for isolating said reference signal source from said energy storing means when the signal input is connected to the output load.

3. A transformerless demodulator comprising in combination: modulated signal source means having a modulated signal output; an output load; reference signal source means for generating a reference signal; switching circuit means interposed between said modulated signal source and said output load; gating circuit means connected between said switching circuit means and said reference signal source for causing said switching means to alternately connect and disconnect said modulated input signal source and said load in response to the output of said reference signal source means, said gating circuit means including means for storing energy from said reference signal source on one half cycle thereof and for discharging energy on the other half cycle thereof, said switching circuit means connecting said modulated signal source to said output load in response to the discharge of energy from said storing and discharge means, said gating circuit means further including means for isolating said reference signal source from said means for storage and discharge when the modulated signal source is connected to the output load.

4. A transformerless demodulator circuit for achieving phase sensitive demodulation of a modulated input signal across an output load in accordance with the output of a reference signal source having negative and positive cycles comprising: bipolar switching means for alternately connecting and disconnecting said modulated input signal and said output load; gating circuit means connected to said bipolar switching means for causing said bipolar switching means to become alternately conductive and non-conductive, said gating circuit means including capacitor means for storing energy from said reference signal source during one half cycle of the output of said reference signal source and discharging said stored energy to cause conduction of said bipolar switching means during the other half cycle of the output of said reference signal source, said gating circuit further including means for conducting electrical energy from said reference signal source to said capacitor means during the non-conduction time of said bipolar switching means and for isolating said capacitor means from said reference signal source during conduction time of said bipolar switching means.

5. The circuit as recited in claim 4 wherein said reference signal source has two opposite phase outputs.

6. A circuit as recited in claim 5 wherein said means for conducting electrical energy from said reference signal source and for isolating said capacitor means from said reference signal source includes a PNP and a NPN transistor, one of said transistors being connected between one of said phase outputs and said capacitor means, the other of said transistors being connected between the opposite phase of said reference signal source and said capacitor means.

7. The circuit as recited in claim 1 wherein said means for storing energy is a capacitor.

8. A transformerless transistorized demodulator comprising in combination:
- a modulated input signal source;
- an output load;
- first and second transistors connected in series between said signal source and said load so as to present an alternating high and low impedance path to said modulated signal;
- a reference signal source;
- third and fourth transistors connected to said first and second transistors so as to control the impedance level of said first and second transistors;
- capacitor storage means connected to said third and fourth transistors, said storage means adapted for storing energy from said reference signal source during one half cycle of the output of said reference signal source and discharging said stored energy to cause said first and second transistors to have a low impedance between said source and said load;
- isolating means connected between said reference source and said capacitor storage means, for isolating said reference source from said capacitor means when the impedance between said signal source and said load is low.

9. The device as claimed in claim 8 wherein said reference source has two opposite phase outputs.

10. The device as claimed in claim 9 wherein said isolating means includes a PNP and an NPN transistor, one of said transistors being connected between one of said phase outputs and said capacitor means, the other of said transistors being connected between the opposite phase of said reference signal source and said capacitor means.

11. In a transformerless demodulator circuit for achieving full wave phase sensitive demodulation of a modulated input signal;
- an output load;
- an alternating reference signal source;
- at least one pair of bipolar switches connected in parallel between said input signal and said load;
- at least one pair of gating means connected between said switches and said reference signal source for alternately causing one of said switches to connect, and the other of said switches to disconnect said modulated signal to said load in response to said reference signal, said gating means including means for storing energy from said reference signal in response to one half cycle of the output thereof and means for causing an energy output in response to the other half cycle, of the output of said reference signal, said switches being turned on in response to the energy output of said gating means.

12. The circuit as recited in claim 11 wherein said gating means further includes means for isolating said reference signal source from said energy storing means when the signal input is connected to the output load.

13. The circuit as recited in claim 11 wherein said means for storing energy is a capacitor.

14. The circuit as recited in claim 11 wherein said reference signal source has two opposite phase outputs, one of said phases being connected to one of said pair of gating means, the other of said phases being connected to the remaining gating means.

References Cited by the Examiner

UNITED STATES PATENTS

| | | | |
|---|---|---|---|
| 2,827,611 | 3/1958 | Beck | 332—52 |
| 2,851,617 | 9/1958 | Walker | 328—97 X |
| 2,941,093 | 6/1960 | Merel | 329—103 |
| 3,015,737 | 1/1962 | Harris et al. | 328—91 X |
| 3,036,273 | 5/1962 | Holbrook et al. | 329—166 X |
| 3,075,150 | 1/1963 | Berman et al. | 329—101 X |

ROY LAKE, *Primary Examiner.*

A. L. BRODY, *Assistant Examiner.*